United States Patent
Aggarwal et al.

(10) Patent No.: US 10,645,129 B2
(45) Date of Patent: May 5, 2020

(54) TECHNIQUES FOR CORRELATING ENGAGEMENT OF ATTENDEES OF AN ONLINE CONFERENCE TO CONTENT OF THE ONLINE CONFERENCE

(71) Applicant: Adobe Inc., San Jose, CA (US)

(72) Inventors: Anurag Aggarwal, Noida (IN); Ajay Jain, Aditya Suntech (IN); Sumeet Gupta, West Patel Nagar (IN); Mili Sharma, C.R. Park (IN)

(73) Assignee: Adobe Inc., San Jose, CA (US)

( * ) Notice: Subject to any disclaimer, the term of this patent is extended or adjusted under 35 U.S.C. 154(b) by 187 days.

(21) Appl. No.: 14/637,265

(22) Filed: Mar. 3, 2015

(65) Prior Publication Data

US 2016/0261655 A1    Sep. 8, 2016

(51) Int. Cl.
| | | |
|---|---|---|
| G06F 15/16 | (2006.01) | |
| H04L 29/06 | (2006.01) | |
| H04N 21/00 | (2011.01) | |
| H04L 12/18 | (2006.01) | |
| G06Q 10/06 | (2012.01) | |
| H04M 3/56 | (2006.01) | |
| H04N 7/15 | (2006.01) | |

(52) U.S. Cl.
CPC .... *H04L 65/4053* (2013.01); *G06Q 10/06311* (2013.01); *H04L 12/18* (2013.01); *H04L 12/1827* (2013.01); *H04M 3/56* (2013.01); *H04N 7/155* (2013.01); *H04N 21/00* (2013.01); *H04M 2201/38* (2013.01); *H04M 2203/554* (2013.01); *H04M 2203/556* (2013.01)

(58) Field of Classification Search
None
See application file for complete search history.

(56) References Cited

U.S. PATENT DOCUMENTS

| | | | |
|---|---|---|---|
| 8,516,105 B2 * | 8/2013 | Chawla | H04L 12/1831 709/204 |
| 8,904,296 B2 | 12/2014 | Sahai et al. | |
| 9,041,766 B1 * | 5/2015 | Gates | H04N 7/15 348/14.08 |
| 2011/0029893 A1 * | 2/2011 | Roberts | G06Q 10/10 715/753 |

(Continued)

*Primary Examiner* — Brian Whipple
*Assistant Examiner* — Anthony T Rotolo
(74) *Attorney, Agent, or Firm* — Kilpatrick Townsend & Stockton LLP (57) ABSTRACT

Disclosed are various embodiments for correlating the measured engagement of attendees to an online conference with the content of the online conference. In one implementation, a timeline is displayed in a user interface for at least a portion of the online conference. The timeline correlates the engagement of the attendees with the content of the online conference based on compiling values measured for engagement parameters of the respective attendees at defined time intervals during the online conference. Input is received identifying a point or interval of the timeline of the online conference. In response to receiving the input, content of the online conference associated with the point or interval is identified and displayed. Alternatively or in addition to displaying content, multiple, different ones of the engagement parameters for the point or interval are identified and have the respective values displayed.

20 Claims, 9 Drawing Sheets

(56) References Cited

U.S. PATENT DOCUMENTS

| | | | |
|---|---|---|---|
| 2012/0002001 A1* | 1/2012 | Prentice | H04N 7/147 348/14.08 |
| 2013/0124623 A1 | 5/2013 | Munter | |
| 2013/0169742 A1* | 7/2013 | Wu | H04N 7/152 348/14.08 |
| 2013/0198288 A1* | 8/2013 | Jones | H04L 12/1831 709/204 |
| 2014/0219433 A1* | 8/2014 | Pai | H04M 3/565 379/202.01 |
| 2016/0073054 A1* | 3/2016 | Balasaygun | H04N 7/15 348/14.08 |

* cited by examiner

TECHNIQUES FOR CORRELATING ENGAGEMENT OF ATTENDEES OF AN ONLINE CONFERENCE TO CONTENT OF THE ONLINE CONFERENCE

BACKGROUND

The engagement of attendees of online conferences, such as "webinars" and massive open online course (MOOC) learning sessions, often varies over the duration of the conference based in part upon the content of the conference (e.g. presentation slides, audio/video), as well as the orchestration of the content presentation by one or more presenters. Moreover, there may be multiple speakers in a single session and engagement levels of attendees driven by each speaker may differ.

Unlike in-person conferences in which the attendees are physically present with the presenter, a presenter in an online conference cannot observe whether the attendees are engaged and paying attention to the presentation. Thus, in order to improve attendee engagement, it would be helpful for presenters to know about the effectiveness of delivered content in driving the engagement of attendees of an online conference on a minute-by-minute, slide-over-slide basis throughout the entire conference such that improvements can be made where needed. In addition, hosts of online conferences could use the engagement data to identify and rate presenters in terms of engagement, as well as evaluate the conference content based on the engagement impact it created during presentation.

SUMMARY

Various aspects of the present invention relate to correlating the measured engagement of attendees to an online conference with the content of the online conference. In one implementation, engagement parameters are used to measure attendee engagement with content of an online conference. The engagement parameters are measured at defined time intervals. The measured engagement parameters are collected for the attendees of the online conference. Values for each one of the engagement parameters collected from the various attendees are compiled for each of the time intervals. A timeline is generated for the duration of the online conference that correlates engagement of the attendees with the content of the online conference. The correlation is based on the values for one or more of the engagement parameters at each of the time intervals.

In some implementations, a timeline is displayed in a user interface for at least a portion of the online conference. Input is received identifying a point or interval of the timeline of the online conference. In response to receiving the input, content of the online conference associated with the point or interval is identified and displayed. Alternatively or in addition to displaying content, multiple, different ones of the engagement parameters for the point or interval are identified and have the respective values displayed.

In various implementations, the timeline is a plotted graph that relates an engagement index of the one or more engagement parameters to the content of the online conference at each of the time intervals. The one or more engagement parameters used to produce the engagement index can be adjusted based at least in part upon types of content used in the online conference. In other implementations, a weight is assigned to each of the one or more engagement parameters used to produce the engagement index.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Described herein are various techniques for correlating the engagement of attendees of an online conference to the content presented in the online conference. Attendees access the online conference through a client application executing in a client device. Unlike in-person conferences in which the attendees are physically present with the presenter, a presenter in an online conference cannot observe whether the attendees are engaged and paying attention to the presentation. Thus, during the online conference, the client application monitors various interactions of attendees with the client device at defined time intervals in order to evaluate each attendee's engagement with the content of the online conference at a given time interval. For example, the client application may identify whether the user is actively using other applications (e.g. web browser, email, etc.) instead of the client application, whether the sound of the conference is muted, and so on. These various interactions, referred to as "engagement parameters," are collected from the clients by the conference service where each engagement parameter is compiled at each time interval across all the attendees. As a result, the engagement of the attendees with the content of the online conference can be accurately estimated at each of the time intervals, thereby permitting the review of the online conferences to be synchronized with an indication of the attendee engagement measured at that point in the conference. Moreover, by correlating the engagement levels with the conference content based on the time intervals, presenters and hosts can receive objective feedback on the presentation of specific content in order to evaluate the performance of each presentation, discover possible improvements to poorly engaging content based on characteristics of highly engaging content, and other possible benefits. In the following discussion, a general description of the system and its components is provided, followed by a discussion of the operation of the same.

As used herein, an "online conference" is a seminar or other meeting comprising one or more presentations of audio and/or video content that is accessible to attendees via a network-connected, processor-based computing device. For example, an online conferences can include web-based seminars ("webinars"), massive open online courses (MOOCs), audio/video conferences, etc.

As used herein, an "attendee" is someone who attends an online conference in one or more roles, such as a presenter of content in the online conference, a host or organizer of the online conference, and/or a participant who listens to and/or views content presented in the online conference.

As used herein, a "timeline" is a data or graphical representation of one or more events arranged chronologically in relation to the time at which the events occurred. For example, a timeline can be used to relate content of an online conference to the particular time at which the content was presented during the online conference.

Figure 1:
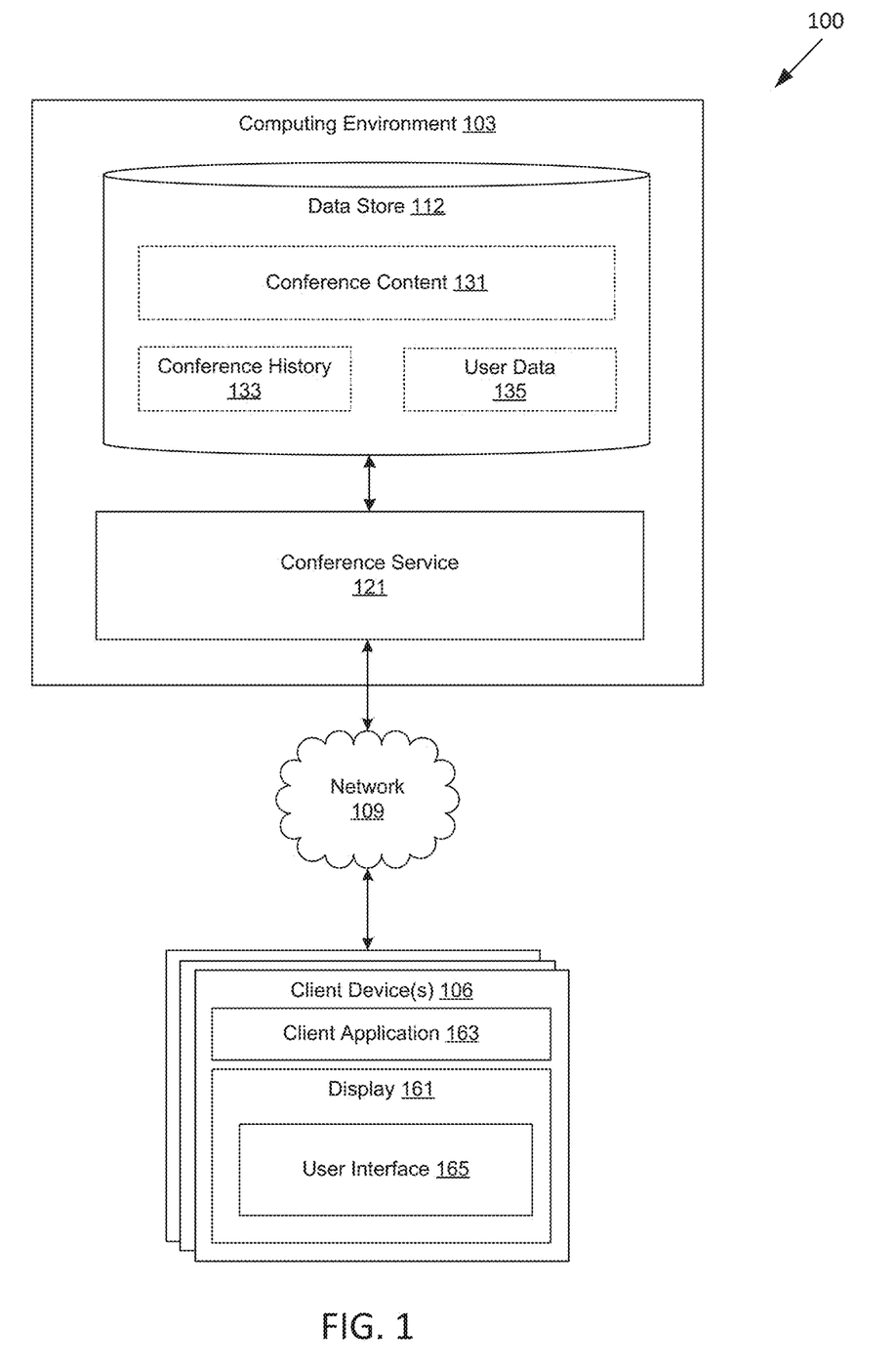
FIG. 1 is a drawing of a networked environment according to various embodiments of the present disclosure.

With reference to FIG. 1, shown is an illustrative networked environment 100 according to various embodiments. The networked environment 100 includes a computing environment 103 and a client device 106, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks. Although the functionality described herein is shown in the context of the networked environment 100, other implementations are possible, such as implementing the functionality in a single computing device (e.g. desktop computer or mobile device), as a plug-in or auxiliary feature of another service executed in a computing device, and/or in arrangements of computing devices other than those shown in FIG. 1.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include a conference service 121, and other applications, services, processes, systems, engines, or functionality not discussed in detail herein. The conference service 121 is executed to facilitate an online conference among various participants via the network 109, as well as correlate measured engagement of online conference attendees with the content of the online conference.

The data stored in the data store 112 includes, for example, conference content 131, conference history 133, user data 135, and potentially other data. The conference content 131 includes the various content presented during the course of one or more online conferences, as well as metadata associated with the online conferences. For each online conference, the conference content 131 includes audio/video recordings of the online conference, presentation source materials (e.g. audio/video, slide presentations, etc.), program poll questions and results, chat transcripts, and/or other possible data relating to the online conference. The metadata for each online conference includes program schedules, types of content presented (e.g. audio, video, slides, etc.), topics of the content, identifiers for presenters of conference content, a list of attendees present during the online conference and times for which they were present, a timeline relating conference content to the time at which the content was presented, time intervals in which the conference was interrupted (e.g. for breaks, etc.), and/or other possible metadata.

The conference history 133 includes a history of each user's measured engagement with content of online conferences facilitated by the conference service 121. For example, the conference history 133 may include values for engagement parameters measured from users attending online conferences; identifiers relating the engagement parameters to a particular conference, user, and time interval; weights to be applied to particular parameters; engagement indices calculated based on engagement parameters for various online conferences; and/or other possible data related to engagement of attendees of the online conferences.

The user data 135 includes various data associated with attendees in online conferences facilitated by the conference service 121. The user data 135 may include user credentials and/or other user identifiers, identifiers of online conferences in which the attendee was present, role(s) of the user in the online conference (e.g. presenter, participant, host, etc.), time periods of in which the user was active in each role, preferences, and/or other possible data.

The client 106 is representative of a plurality of client devices that can be coupled to the network 109. The client 106 comprises, for example, a processor-based system such as a computer system (e.g. desktop or laptop computer, smartphone, etc.). In some embodiments, the client 106 includes a display 161, such as a liquid crystal display (LCD) or other type of display device.

The client 106 may be configured to execute various applications such as a client application 163 and/or other applications. The client application 163 may be executed in a client 106, for example, to access network content served up by the computing environment 103 and/or other servers, thereby rendering a user interface 165 on the display 161. To this end, the client application 106 may comprise, for example, a browser, a dedicated application such as an online conference application, etc., and the user interface 165 may comprise a network content page, an application screen, etc. The client 106 may be configured to execute applications beyond the client application 163 such as, for example, email applications, social networking applications, word processors, spreadsheets, and/or other applications.

Next, a general description of the operation of the various components of the networked environment 100 is provided. To begin, a user operating the client 106 employs the client application 163 to establish a communication session with the conference service 121. The communication session may be carried out using various protocols such as, for example, hypertext transfer protocol (HTTP), simple object access protocol (SOAP), representational state transfer (REST), user datagram protocol (UDP), transmission control protocol (TCP), and/or other protocols for communicating data over the network 109. In some implementations, the user is authenticated to the conference service 121 using one or more user credentials.

Figure 2:
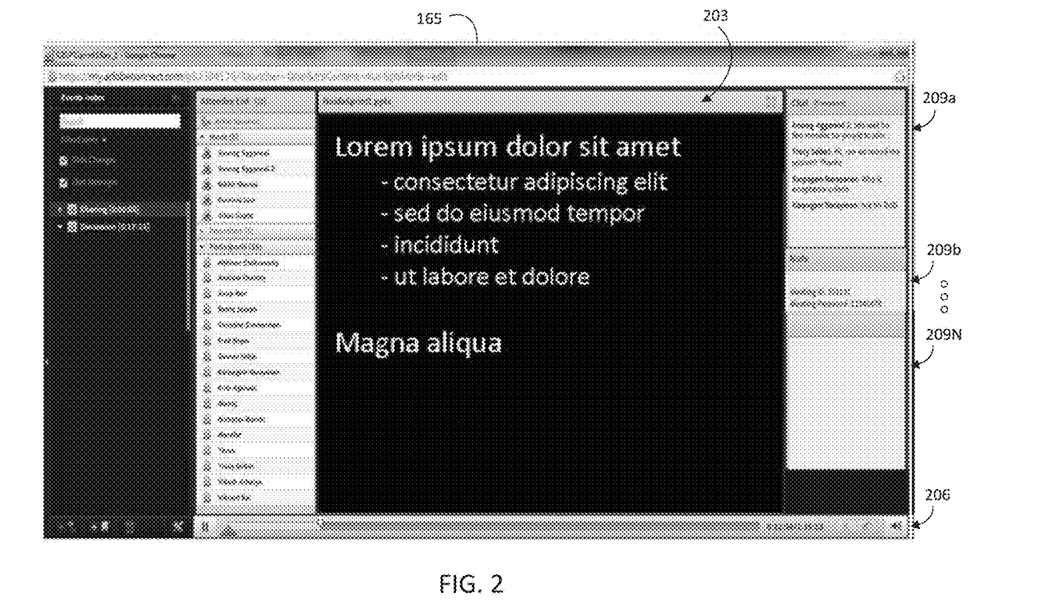
FIG. 2 is a pictorial diagram of an example user interface rendered by a client in the networked environment of FIG. 1 according to various embodiments of the present disclosure.

Thereafter, users who are attending an online conference (i.e. attendees) may be presented with a user interface 165 for the client application 163, such as shown in FIG. 2. During the online conference, various aural and/or visual content may be presented by one or more presenters and received by the various other attendees via the client application 163. The visual content including, for example, presentation slides, still images, video, etc. can be presented in the presentation panel 203, and the aural content, such as music and speech, can be controlled for each client in the audio panel 206. In addition, the client application 163 may offer various other features for attendees in the feature panels 209*a*-N, such as group messaging/conversations (e.g. text, audio, video) among attendees, note taking and bookmarking, responding to polls, providing feedback to presenters/hosts (e.g. applause, go faster/slower), etc.

In order to evaluate the engagement of attendees of an online conference, each instance of the client application 163 operated by an attendee can monitor various aspects of the user interface 165 in order to estimate the engagement of the respective attendee with the content of the online conference. Since both the content and the attendee engagement varies throughout the duration of the online conference, the attendee engagement is measured at defined time intervals (e.g. every one minute) in order to determine how engagement levels change over time for the attendees. The time interval(s) to be used for measuring engagement parameters, attendees whose engagement is to be or not be measured, and a schedule for measuring during a given online conference can be configured during setup of the communication sessions for the online conference and can be altered during the course of the conference.

For example, during setup of the communication session, the client application 163 is directed by the conference service 121 to measure each engagement parameter on a three-minute time interval beginning at 8 A.M. until 4 P.M. Continuing the example, during the online conference the conference service 121 may further direct the client application 163 to pause measuring the engagement parameter during noon to 1 P.M. while the attendees will be on break.

The level of engagement is measured based on various engagement parameters associated with the client application 163. The engagement parameters include, for example: whether the user interface 165 has primary focus on the display 161 of the client device 106; whether the attendee participates in group messaging, polls, note taking, and/or other features of the online conference; number of attendees; whether the user is near the client device (i.e. proximity sensor); whether the attendee is interacting with other applications on the client device 106 instead of the client application 163; whether the presentation panel 203, audio panel 206, and/or any of the feature panels 209*a*-N are closed or disabled; interactions with the playback timeline; and/or other possible activities that reflect engagement of an attendee with the content of an online conference.

The specific engagement parameters to be measured, the time interval(s) to be used for measuring engagement parameters, and a schedule for their use during a given online conference can be configured during setup of the communication session of the online conference and can be altered during the course of the online conference. The "direction" from the conference service 121 can be in the form of one or more commands sent via the communication session to the client application 163, to another other application on the client device 106, and/or to the operating system of the client device 106. The engagement parameters to be measured can further be based upon the content and features of the particular online conference. For example, if a particular online conference has disabled the group messaging feature, then measuring an engagement parameter associated with the disabled feature would not be performed.

In some embodiments, the value for a particular engagement parameter may be a binary value indicating whether an attendee did or did not undertake a specific action during a given time interval. For example, the value of the engagement parameter related to application focus may be '0' for a given one-minute time interval if the user interface 165 is minimized or hidden behind an interface for a different application, while the value may be '1' if the application has primary focus on the display.

In other embodiments, the value indicates for how long or how often the attendee undertakes the specific action during the given time interval. For example, the value of the engagement parameter related to application focus may be '100' if the application had primary focus on the display for the entire one-minute time interval, the value may be '50' if the application had primary focus on the display for half of the one-minute time interval, and the value may be '0' if the application did not have primary focus on the display for any time during the one-minute time interval.

In still other embodiments, the value of the engagement parameter is subject to decay. For example, if the client application has primary focus on the display for the entire online conference, the value of the engagement parameter related to application focus may be '100' for each of some initial number of time intervals. However, if no other defined set of activities occurs (e.g. touch/mouse/keyboard input received), then the value assigned for the application focus engagement parameter may begin a decay schedule whereby the value for this parameter is reduced unless another activity occurs and despite the client application still retaining primary focus.

The values measured for the various engagement parameters of attendees are transmitted from the client devices 106 of the attendees to the conference service 121 of the computing environment 103. In some embodiments, measured values for the engagement parameters are collected as they are measured during the conference. In other embodiments, the measured values are stored on the client device, where they are transmitted to the conference service 121 on a periodic and/or event driven basis.

As the values for the various engagement parameters are collected from client devices 106 of the attendees, the conference service 121 can begin compiling values for each of the engagement parameters at specific time intervals across all of the attendees. For example, using an engagement parameter indicating whether the audio was muted, at the start of the online conference 95% of the attendees were listening to the conference audio, which was maintained until the five-minute time interval of 55-60 minutes, during which 40% of the attendees had muted sound output from the client application 163.

Figure 3:
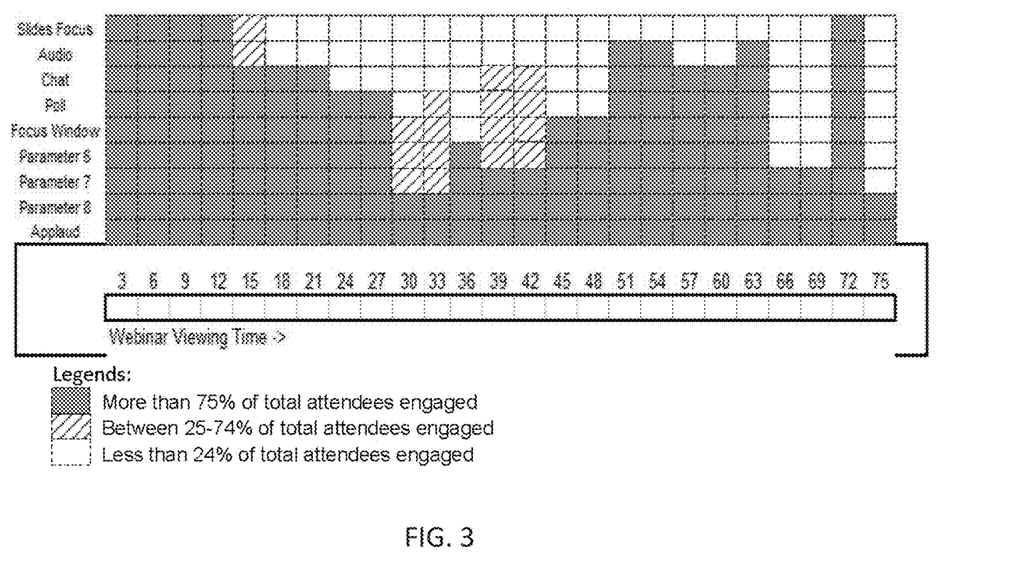
FIG. 3 is a pictorial diagram of an exemplary chart rendered in a user interface by a client in the networked environment of FIG. 1 according to various embodiments of the present disclosure.

Collectively, the values of the engagement parameters reflect a level of engagement by the attendees and show how the level of engagement can change in relation to the timeline and content of the online conference. One technique for visualizing the collective engagement of the attendees is with a chart such as shown in FIG. 3. In FIG. 3, each of the engagements parameter values are presented versus a timeline comprising the measured time intervals, where the engagement parameter values are given in relation to thresholds (e.g. good, average, poor). For instance, as shown in FIG. 3, more than 75% of the attendees engaged in group chat for the first 21 minutes, then less than 24% of the attendees were engaged in group chat for minutes 21-36. While the chart of FIG. 3 allows individual engagement parameters to be examined that each provide one aspect of attendee engagement, the chart also illustrates general engagement trends such as the decline in various engagement parameters beginning at the 12-15 minute time interval that continued until a gradual recovery in engagement begins at the 33-36 minute time interval.

To further simplify determining trends in attendee engagement, the conference service 121 may combine various engagement parameters to determine an engagement index. In this manner, each of the selected engagement parameters at each time interval may be combined by a mathematical function to produce a single engagement index value for each time interval. The mathematical functions can be functions to compute the mean, median, weighted mean, and/or other types of values, as can be appreciated. For example, if three engagement parameters are selected as input having values of '10', '50', and '90' at a given time interval, the engagement index value at the time interval computed as a mean would be '75'=('10'+'50'+'90')/3.

However, some engagement parameters may be considered more or less indicative of engagement than other engagement parameters. For example, if an attendee actively participated in polls given during the online conference, this could be more indicative of engagement than an engagement parameter showing that an attendee merely had the audio of the conference at a listenable level. As such, the values for the engagement parameter for poll participation may be weighted more heavily than the engagement parameter for audio. Continuing the example, at a given time interval the value for poll participation among attendees may be '30,' while the value for the audio engagement parameter is '90.' If an engagement index is computed based only using only these two engagement parameters, a weight of (0.8) could be used for poll participation, while a weight of (0.2) is used for audio, thereby giving more weight to the poll participation parameter. Thus, the engagement index value at the time interval computed as a weighted mean would be '42'=('30' (0.8)+'90'(0.2)).

Figure 4:
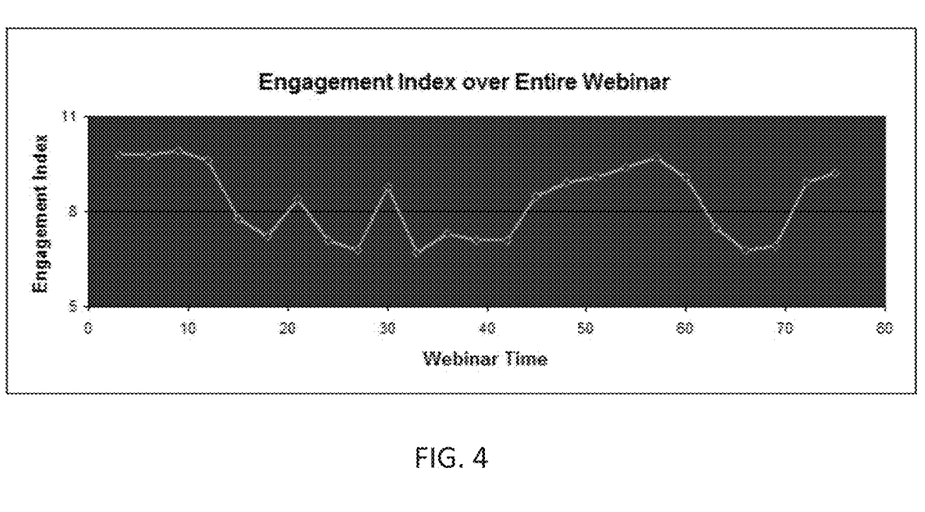
FIG. 4 is a pictorial diagram of an exemplary graph rendered in a user interface by a client in the networked environment of FIG. 1 according to various embodiments of the present disclosure.

Using the selected engagement parameters, the conference service 121 computes an engagement index at each of the time intervals. Thereafter, the conference service 121 can produce a visualization, such as shown in FIG. 4, of the engagement index versus a timeline comprising the measured time intervals of the online conference. The graphical illustrations of attendee engagement timelines shown in FIGS. 3 and/or 4 can be incorporated into a review of earlier online conferences that are available for viewing via the conference service 121.

Figure 5:
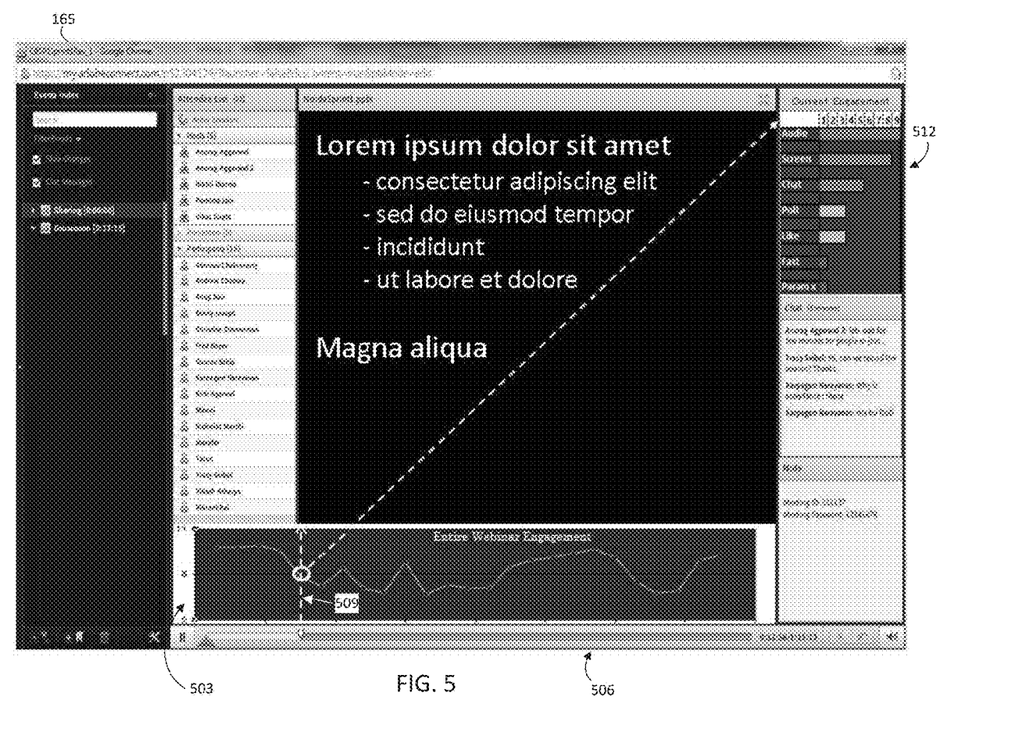
FIG. 5 is a pictorial diagram of another example user interface rendered by a client in the networked environment of FIG. 1 according to various embodiments of the present disclosure.

As shown in the example user interface of FIG. 5, using the client application 163, a user can playback or otherwise review an online conference such that the timing of the playback is synchronized with the corresponding time interval for the engagement index shown in the exemplary engagement index panel 503. To adjust the playback of the online conference, such as jumping to a different portion of the conference playback, the user may interact with the playback bar 506 and/or by selecting an area of the engagement index panel 503 corresponding to a time interval or engagement index. Once selected, playback of the content of the online conference begins at the selected position and allows a user to observe the level of engagement by the attendees in relation to the content presented at that time. In addition, a marker 509 can be used to track the engagement index that corresponds to the conference content currently presented.

Figure 6:
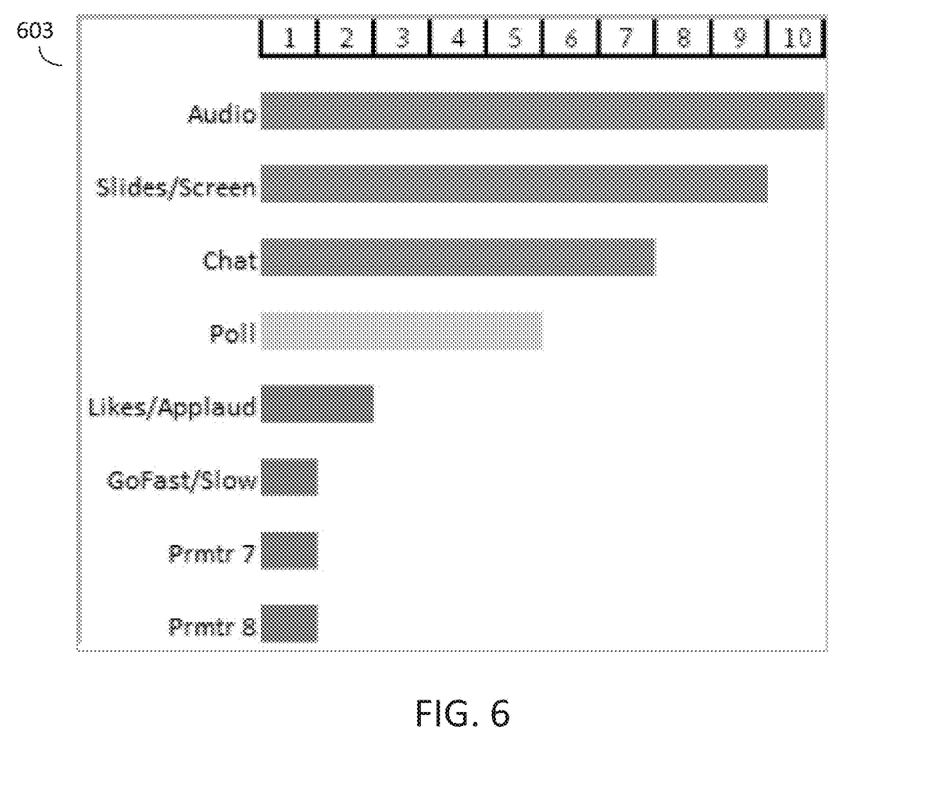
FIG. 6 is a pictorial diagram of another exemplary chart rendered in a user interface by a client in the networked environment of FIG. 1 according to various embodiments of the present disclosure

In some embodiments, the user interface 165 also includes an engagement parameters panel 512. Like the engagement index panel 503, the engagement parameters panel 512 updates to reflect values for some or all the engagement parameters collected for the time interval corresponding to the conference content currently presented. In a variation of these embodiments, the engagement parameters panel 512 responds to selection (e.g. a mouse-click) by presenting an expanded engagement parameters panel 603 within the user interface 165, such as shown in FIG. 6. The expanded engagement parameters panel 603 can include values for additional engagement parameters available for a given time interval.

Returning to FIG. 5, in other embodiments, a user interacts with the user interface 165 to select different engagement parameters for use in calculating the engagement index shown in the engagement index panel 503, as well as to be shown in the engagement parameters panel 512. For example, while group messaging may have been available and used during an online conference, a user reviewing the online conference wishes to evaluate the level of engagement without regard to group messaging use. Thus, the user can interact with the user interface 165 to specify which engagement parameters are used or not used for computing the engagement index (not shown), such as specifying that group messaging should not be used to calculate the engagement index presented to this user. As a result, the conference service 121 recomputes the engagement index for this user based on his/her specified list of engagement parameters and updates the engagement index panel 503 for the particular user accordingly.

In still other embodiments, a user can interact with the user interface 165 to specify various criteria of interest related to the engagement parameters (not shown) in order to playback the conference content related to the criteria. For example, a user may specify that they wish to review the content of the online conference associated with the highest/lowest levels of engagement, associated with rapidly increasing/decreasing levels of engagement, and/or other possibilities, as can be appreciated. Other criteria can also be added such as, the identity of a presenter, keywords in the conference content, a time range, and/or other possible criteria. For example, the user may seek to review the content associated with the lowest level of engagement for presenter John Doe that occurred after 1 P.M., and can specify such criteria through the user interface.

In still other embodiments, the conference service 121 performs a statistical inference, such as a Bayesian inference, using the engagement parameters and/or engagement index for each time interval along with conference content (e.g. text/transcripts from presentations) and metadata (e.g. presenter name, topics) associated with the respective time interval. By adding such historical data to the inference database from various online conferences, the conference service 121 can improve estimations of future attendee engagement based on characteristics such as the content and/or metadata for the content.

Figure 7:
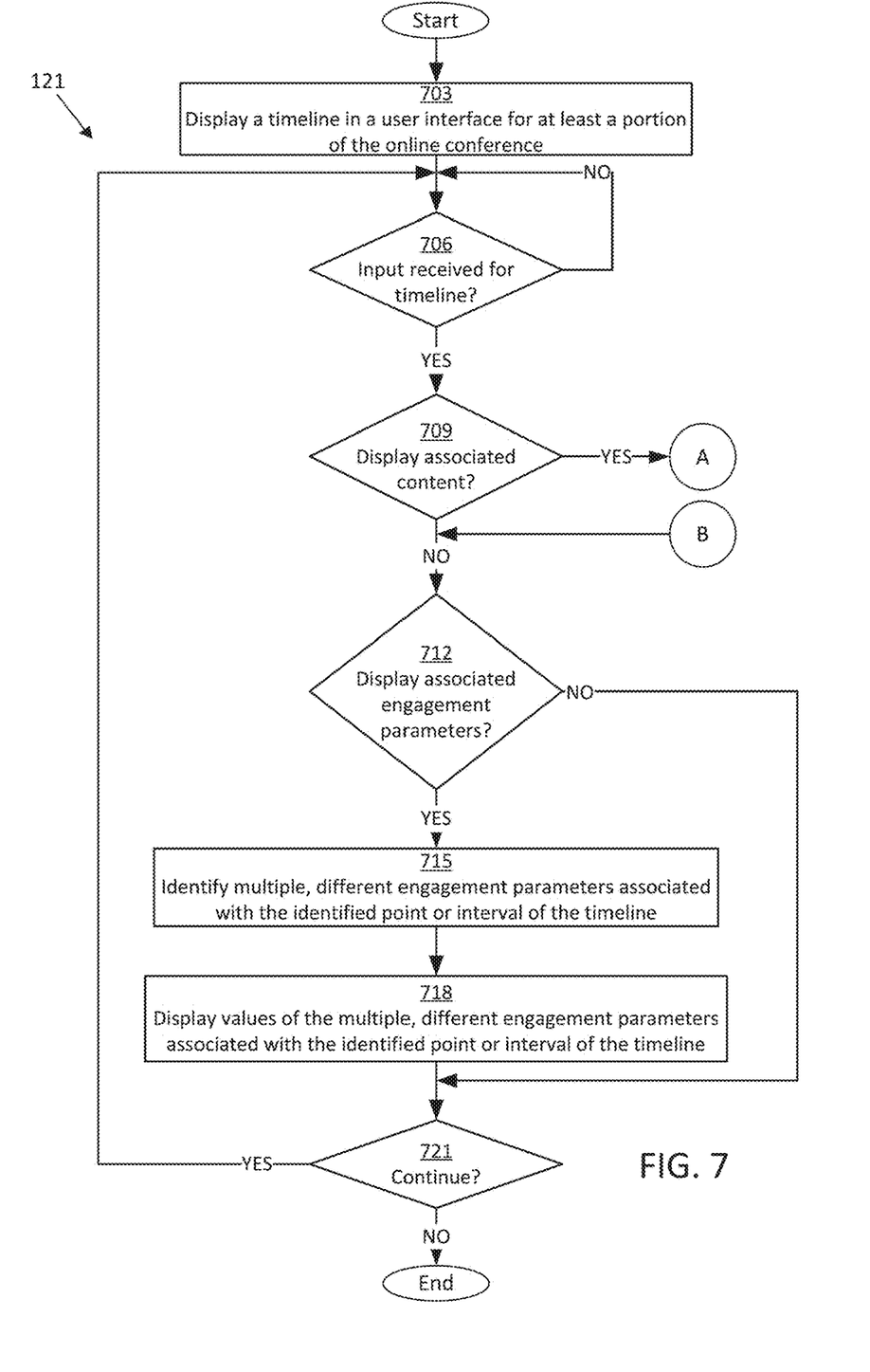
FIGS. 7 and 8 are flowcharts illustrating examples of functionality implemented as portions of the conference service executed in a computing environment in the networked environment of FIG. 1 according to various embodiments of the present disclosure.

Referring next to FIG. 7, shown is a flowchart that provides one example of the operation of a portion of the conference service 121 according to various embodiments. It is understood that the flowchart of FIG. 7 provides merely an example of the many different types of functional arrangements that may be employed to implement the operation of the portion of the conference service 121 as described herein. As an alternative, the flowchart of FIG. 7 may be viewed as depicting an example of elements of a method implemented in the computing environment 103 according to one or more embodiments. The portion of the operation of the conference service 121 depicted in FIG. 7 may be initiated in response to receiving a request from the client application 163, via an established communication session, to review an online conference, such as shown in the exemplary user interface of FIG. 5.

Beginning with block 703, the conference service 121 displays a timeline in a user interface for at least a portion of an online conference. The timeline correlates engagement of the attendees with the content of the online conference and can be retrieved from a data store or generated as needed by the conference service 121. To generate the timeline, the conference service 121 uses values for the engagement parameters collected for the various attendees. Computation of a timeline, such as illustrated in graphical form in FIGS. 3-5, can use the raw values for the engagement parameters collected from the attendees or can involve combining values from various engagement parameters to determine an engagement index. While a timeline for the conference can be created after the online conference has concluded, in some embodiments a timeline can also be created and modified while the online conference is in session using the values for the engagement parameters as they are received from the client devices 106 of the attendees.

Next, in block 706, the conference service 121 determines whether input has been received identifying a point or interval on the timeline. For example, a user selects a time interval corresponding to the highest engagement level on a timeline for the engagement index of a given online conference.

In some embodiments, a user can interact with the user interface to specify various criteria of interest related to the engagement parameters. For example, a user may specify that they wish to review portions of the online conference associated with the highest/lowest levels of engagement, associated with rapidly increasing/decreasing levels of engagement, and/or other possibilities, as can be appreciated. Other criteria can also be added such as, the identity of a presenter, keywords in the conference content, a time range, and/or other possible criteria. For example, the user may seek to review the content associated with the increasing levels of engagement for presenter Jane Doe in which the keyword "privacy" was mentioned in a slide or in a transcript of the audio, and can specify such criteria through the user interface 165. Based on any received criteria, the conference service 121 determines the time intervals of the online conference matching the criteria specified by the user and can create cue points or presets for each of the matching time intervals of the conference. Using cue points, a user can to skip among and return to the time intervals of the online conference matching the specified criteria.

Continuing, if no input identifying a point or interval of the timeline was received, execution of the conference service 121 returns to block 706 where it may continue any current tasks and awaiting further input. Alternatively, if such input was received, in block 709, the conference service 121 determines whether online conference content associated with the identified point or interval of the timeline is to be displayed. The determination of whether to display the content can be determined by the conference service 121 based on a user preference, input received via the user interface, and/or other methods, as can be appreciated.

Figure 8:
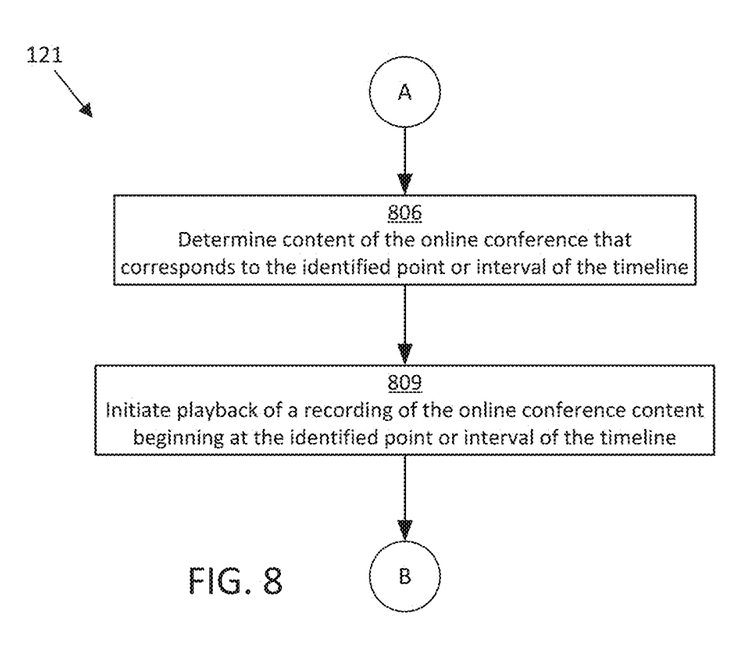

If, the content of the online conference associated with the identified point or interval of the timeline is to be displayed, then execution of the conference service proceeds to block A, the operation of which is discussed in FIG. 8. Alternatively, if the content is not to be displayed or if execution of the conference service 121 has returned from block B discussed in FIG. 8, execution of the conference service 121 proceeds to block 712.

In block 712, the conference service 121 determines whether to display individual ones of engagement parameters associated with the identified point or interval of the timeline. Although the flowchart of FIG. 7 presents a serialized operation for displaying the content and/or displaying individual engagement parameters, as can be appreciated, these operations can also be performed in parallel. Operating in parallel, the conference service 121 can orchestrate playback of the content associated with the identified point or interval of the timeline while the engagement parameters associated with the identified point or interval are also presented.

Continuing, if the engagement parameters are not to be displayed in block 712, execution of the conference service 121 proceeds to block 721. Alternatively, if the engagement parameters are to be displayed, in block 715, the conference service 121 identifies the particular engagement parameters associated with the identified point or interval of the timeline that are to be displayed. The engagement parameters to be displayed can include all or a subset of the engagement parameters measured for the various attendees at the corresponding point in the online conference. The particular engagement parameters presented can be based on the types of engagement parameters collected, a user preference, input received via the user interface (e.g. specifying filter criteria, selecting specific engagement parameters, etc.), and/or other methods, as can be appreciated.

Then, in block 718, the conference service 121 displays the identified engagement parameters associated with the identified point or interval of the timeline, such as shown in the exemplary engagement parameters panel 512 (FIG. 5). In some embodiments, the conference service 121 is responsive to input requesting presentation of additional ones of the engagement parameters, such as shown in the exemplary expanded engagement parameters panel 603 (FIG. 6). The additional engagement parameters may include all the available engagement parameters or simply additional ones of the engagement parameters not included in earlier views of the engagement parameters panel.

Subsequently, in block 721, the conference service 121 determines whether to continue presentation of the content and/or engagement parameters of the online conference. For example, a user may wish to end the presentation(s). If the conference service 121 is not to continue, then this portion of the execution of the conference service 121 ends as shown. Alternatively, if the current execution of the conference service 121 is to continue, execution returns to block 706 to await additional input from a user. In some embodiments, the conference service 121 continues any presentations while awaiting additional input. For example, a user may have previously selected a time interval (e.g. time interval 5:00-5:30) and began presentation of conference content and engagement parameters at the time interval. In the absence of additional input from the user, the conference service 121 can continue the presentation to include content and engagement parameters associated with subsequent time intervals (e.g. time intervals after 5:30) or cue points. In these embodiments, the particular engagement parameters and the respective values displayed are updated to remain in synchronization with the current time interval being played back.

Turning now to FIG. 8, shown is a flowchart that provides another example of the operation of a portion of the conference service 121 according to various embodiments. It is understood that the flowchart of FIG. 8 provides merely an example of the many different types of functional arrangements that may be employed to implement the operation of the portion of the conference service 121 as described herein. As an alternative, the flowchart of FIG. 8 may be viewed as depicting an example of elements of a method implemented in the computing environment 103 according to one or more embodiments. The portion of the operation of the conference service 121 depicted in FIG. 8 may be initiated in response to receiving a request from the client application 163, via an established communication session, to review content of an online conference, such as shown in the exemplary user interface of FIG. 5.

Beginning in block 806 and continuing from block A discussed in FIG. 7, the conference service 121 determines the content of the online conference associated with the identified point or interval of the timeline that is to be displayed. For example, the identified point or interval of the timeline can be an interval of the timeline selected with a mouse-click by a user, one of a set of cue points selected, and/or other forms of input as can be appreciated. The content can include various aural and/or visual content presented by one or more presenters and received by the various attendees via the client application. The content can include, for example, presentation slides, still images, audio/video, etc. In addition, the content to be viewed can include results from polls, notes taken, group messages sent received, etc. The particular types of content to be presented can be based on types of content available, a user preference, input received via the user interface (e.g. specifying filter criteria, selecting content types, etc.), and/or other methods, as can be appreciated.

Then, in block 809, the conference service 121 can initiate playback of content of the online conference beginning at the identified point or interval of the timeline selected by a user, including a point or interval specified by a cue point. Using cue points during playback, a user can to skip among and return to the time intervals of the online conference at which content matching the criteria was found. Subsequently, the conference service 121 proceeds to block B discussed in FIG. 7. As discussed above, in some embodiments, the conference service 121 continues any presentation(s) to include subsequent time intervals or cue points in the absence of user input or other requests to end the presentation(s).

Figure 9:
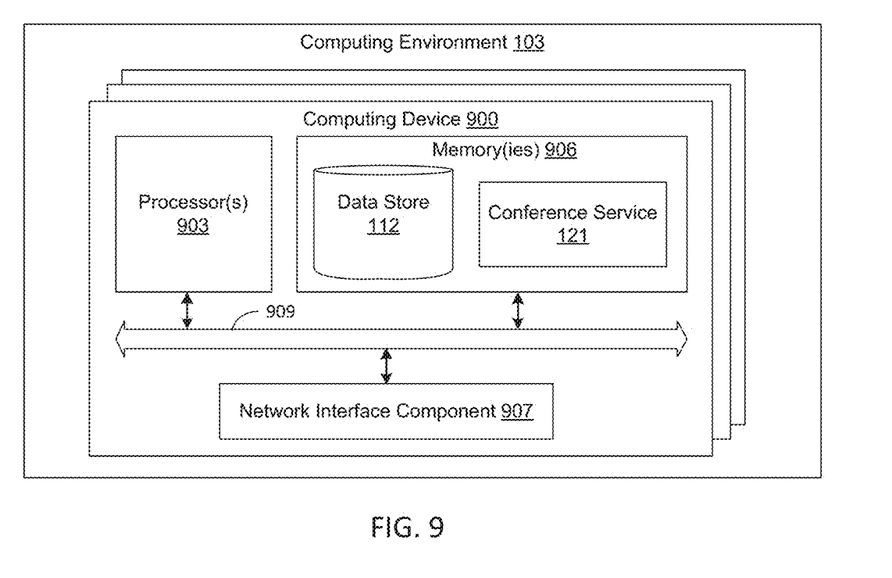
FIG. 9 is a schematic block diagram that provides one example illustration of a computing environment employed in the networked environment of FIG. 1 according to various embodiments of the present disclosure.

With reference to FIG. 9, shown is a schematic block diagram of the computing environment 103 according to an embodiment of the present disclosure. The computing environment 103 includes one or more computing devices 900. Each computing device 900 includes at least one processor circuit, for example, having a processor 903 and a memory 906, both of which are coupled to a local interface 909. To this end, each computing device 900 may comprise, for example, at least one server computer or like device. The local interface 909 may comprise, for example, a data bus with an accompanying address/control bus or other bus structure as can be appreciated.

Stored in the memory 906 are both data and several components that are executable by the processor 903. In particular, stored in the memory 906 and executable by the processor 903 are a conference application 121, and potentially other applications. Also stored in the memory 906 may be a data store 112 and other data. In addition, an operating system may be stored in the memory 906 and executable by the processor 903.

It is understood that there may be other applications that are stored in the memory 906 and are executable by the processor 903 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903 may represent multiple processors 903 and/or multiple processor cores and the memory 906 may represent multiple memories 906 that operate in parallel processing circuits, respectively. In such a case, the local interface 909 may be an appropriate network that facilitates communication between any two of the multiple processors 903, between any processor 903 and any of the memories 906, or between any two of the memories 906, etc. The local interface 909 may comprise additional systems designed to coordinate this communication, including, for example, performing load balancing. The processor 903 may be of electrical or of some other available construction.

Although the conference service 121 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 7 and 8 show the functionality and operation of an implementation of portions of the conference service 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 903 in a computer system or other system. The machine code may be converted from the source code, etc. If embodied in hardware, each block may represent a circuit or a number of interconnected circuits to implement the specified logical function(s).

Although the flowcharts of FIGS. 7 and 8 show a specific order of execution, it is understood that the order of execution may differ from that which is depicted. For example, the order of execution of two or more blocks may be scrambled relative to the order shown. Also, two or more blocks shown in succession in FIGS. 7 and 8 may be executed concurrently or with partial concurrence. Further, in some embodiments, one or more of the blocks shown in FIGS. 7 and 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the conference service 121, that comprises software or code can be embodied in any non-transitory computer-readable medium for use by or in connection with an instruction execution system such as, for example, a processor 903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the conference service 121, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 900, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method implemented in at least one computing device for correlating engagement of attendees to an online conference with content of the online conference, the method comprising: computing engagement indexes for an online conference, wherein each engagement index corresponds to a time interval and is computed from a corresponding set of values of engagement parameters for attendees of the online conference, the engagement parameters including: a first engagement parameter indicating how the online conference is presented at user devices of the attendees, a second engagement parameter indicating user interactions with the online conference at the user devices, and a third engagement parameter having a value (i) that is based on a proportion of time that a conference application of an attendee is in focus and (ii) that, when no input is received, is reduced according to a delay schedule until an additional input is received; providing a user interface that displays a first region depicting content presented via the online conference, a second region depicting a timeline for the online conference and a plot of the engagement indexes at corresponding points along the timeline; receiving user input identifying an interval of the timeline of the online conference; and updating, responsive to the user input, the user interface to display, in a third region of the user interface, (i) an identified set of engagement parameters used to compute an engagement index the identified interval and (ii) a set of values corresponding to the identified set of engagement parameters, wherein the third region is displayed simultaneously with the first region and the second region.

2. The method of claim 1, further comprising identifying a plurality of cue points for the timeline.

3. The method of claim 2 wherein the user input further specifies a selection of a first cue point and a second cue point of the cue points, wherein the first cue point and the second cue point identify an interval of the timeline, further comprising displaying content of the online conference associated with the interval.

4. The method of claim 1, wherein the engagement parameters measured for the attendees are determined based at least in part upon a type of content used in the online conference.

5. The method of claim 1, wherein the user input comprises a selection of an engagement parameter.

6. The method of claim 1, further comprising responsive to receiving additional input requesting additional engagement parameters, displaying representations of respective values of additional the engagement parameters, wherein the additional engagement parameters are measured by computing devices of the attendees during the online conference.

7. The method of claim 1, wherein measuring the engagement parameters comprises determining that an attendee performs one or more of: viewing a display or a window where visual content of the online conference is presented by a client application, listening to content of the online conference presented by the client application, participating in group messaging associated with the online conference, providing feedback during the online conference, or interacting with applications other than the client application.

8. The method of claim 1, wherein the engagement parameters further indicate one or more of: (i) whether a conference application has primary focus on a display; (ii) participation in taking; (iii) a number of attendees; (iv) proximity to a client device as determined by a proximity sensor; (iv) interaction with other applications; (iv) whether any conference application panels are closed or disabled; or (v) whether conference application is minimized or hidden behind another application.

9. The method of claim 2, further comprising: identifying, for each cue point, an item of content that corresponds to a respective cue point of the plurality of cue points; and displaying the items of content.

10. The method of claim 1, further comprising, prior to computing the engagement indexes: identifying a time period in which the online conference is to be presented and a pause time interval, within the time period, in which a presentation of the online conference is paused; commencing a measurement of values of the engagement parameters at a start of the time period; pausing the measurement of values of the engagement parameters during the pause time interval; and continuing the measurement of values of the engagement parameters after the pause time interval has elapsed, wherein a computation of the engagement indexes includes the measurement of values during the time period and excludes any values of the engagement parameters during the pause time interval.

11. A system comprising: a processing device; and a non-transitory computer-readable medium communicatively coupled to the processing device, wherein the processing device is configured to perform operations comprising: computing engagement indexes for an online conference, wherein each engagement index corresponds to a time interval and is computed from a corresponding set of values of engagement parameters for attendees of the online conference the engagement parameters including: a first engagement parameter indicating how the online conference is presented at user devices of the attendees, a second engagement parameter indicating user interactions with the online conference at the user devices, and a third engagement parameter having a value (i) that is based on a proportion of time that a conference application of an attendee is in focus and (ii) that, when no input is received, is reduced according to a delay schedule until an additional input is received; providing a user interface that displays a first region depicting content presented via the online conference, a second region depicting a timeline for the online conference and a plot of the engagement indexes at corresponding points along the timeline; receiving user input identifying an interval of the timeline of the online conference; and updating, responsive to the user input, the user interface to display, in a third region of the user interface, (i) an identified set of engagement parameters used to compute an engagement index the identified interval and (ii) a set of values corresponding to the identified set of engagement parameters, wherein the third region is displayed simultaneously with the first region and the second region.

12. The system of claim 11, wherein the processing device is further configured to perform operations comprising identifying a plurality of cue points for the timeline and wherein the user input comprises a selection of one of the cue points.

13. The system of claim 12, wherein the processing device is further configured to perform operations comprising: receiving input specifying an additional one of the cue points corresponding to an additional point or interval of the timeline; and displaying content of the online conference associated with the additional point or interval.

14. The system of claim 11, wherein the user input further comprises a selection of an engagement parameter.

15. The system of claim 11, wherein the operations further comprise: identifying a keyword associated with the content of the online conference; and displaying the keyword on the timeline.

16. The system of claim 11, wherein computing the engagement indexes comprises, for at least one attendee from the attendees: determining that the online conference is presented on at least one user device of the at least one attendees during a first set of time intervals and a second set of time intervals; determining a lack of interaction, during the first set of time intervals and the second set of time intervals, with the online conference by the at least one user device; computing an initial engagement score for the first set of time intervals based on the online conference being presented on the at least one user device during the first set of time intervals; computing reduced engagement scores for the second set of time intervals by reducing the initial engagement score based on the lack of interaction, during the first set of time intervals and the second set of time intervals, with the online conference by the at least one user device, wherein the reduced engagement scores are computed with a decay function that causes each reduced engagement score to be less than a previously computed reduced engagement score, where the initial engagement score and the reduced engagement scores are combined with engagement scores of other attendees to compute the engagement indexes.

17. A non-transitory computer-readable medium with program code stored thereon, wherein the program code is executable by a computing device to perform operations comprising: computing engagement indexes for an online conference, wherein each engagement index corresponds to a time interval and is computed from a corresponding set of values of engagement parameters for attendees of the online conference the engagement parameters including: a first engagement parameter indicating how the online conference is presented at user devices of the attendees, a second engagement parameter indicating user interactions with the online conference at the user devices, and a third engagement parameter having a value (i) that is based on a proportion of time that a conference application of an attendee is in focus and (ii) that, when no input is received, is reduced according to a delay schedule until an additional input is received; providing a user interface that displays a first region depicting content presented via the online conference, a second region depicting a timeline for the online conference and a plot of the engagement indexes at corresponding points along the timeline; receiving user input identifying an interval of the timeline of the online conference; and updating, responsive to the user input, the user interface to display, in a third region of the user interface, (i) an identified set of engagement parameters used to compute an engagement index the identified interval and (ii) a set of values corresponding to the identified set of engagement parameters, wherein the third region is displayed simultaneously with the first region and the second region.

18. The non-transitory computer-readable medium of claim 17, wherein the operations further comprise: receiving, via the user interface, an engagement criterion indicating a specified value or range of values for the engagement indexes; receiving, via the user interface, a content criterion identifying one or more of a speaker in the online conference and a keyword applied to content of the online conference; identifying, an additional time interval that has both (i) an engagement index matching the engagement criterion received via the user interface and (ii) content matching an content criterion received via the user interface; and updating the user interface to display, on the timeline in the second region, cue points that correspond to the additional time interval and that visually distinguish the additional time interval from other time intervals on the timeline, wherein the user input identifying the interval of the timeline of the online conference comprises a selection of one or more of the cue points.

19. The non-transitory computer-readable medium of claim 17, wherein the operations further comprise responsive to receiving additional input requesting an additional engagement parameter, displaying representations of values of the additional engagement parameter, wherein the additional engagement parameter was measured by computing devices of the attendees during the online conference.

20. non-transitory computer-readable medium of claim 17, wherein the operations further comprising comprise: identifying a keyword associated with the content of the online conference; and displaying the keyword on the timeline.

* * * * *